(12) United States Patent
Okada

(10) Patent No.: US 10,430,089 B2
(45) Date of Patent: Oct. 1, 2019

(54) COPY METHOD OF COPYING INFORMATION BETWEEN FIRST PROCESSING APPARATUS AND SECOND PROCESSING APPARATUS, THE FIRST PROCESSING APPARATUS, AND THE SECOND PROCESSING APPARATUS

(71) Applicant: BROTHER KOGYO KABUSHIKI KAISHA, Nagoya-shi, Aichi-ken (JP)

(72) Inventor: Ayaka Okada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 171 days.

(21) Appl. No.: 15/472,770

(22) Filed: Mar. 29, 2017

(65) Prior Publication Data
US 2018/0095683 A1    Apr. 5, 2018

(30) Foreign Application Priority Data

Sep. 30, 2016 (JP) .................................. 2016-193826

(51) Int. Cl.
*H04L 29/06* (2006.01)
*G06F 3/06* (2006.01)
(Continued)

(52) U.S. Cl.
CPC ............ *G06F 3/0619* (2013.01); *G06F 3/062* (2013.01); *G06F 3/065* (2013.01); *G06F 3/067* (2013.01);
(Continued)

(58) Field of Classification Search
CPC ........ G06F 3/0619; G06F 3/062; G06F 3/065; G06F 3/067; G06F 3/0683; G06F 21/60
(Continued)

(56) References Cited

U.S. PATENT DOCUMENTS

2005/0183141 A1* 8/2005 Sawada .................. G03G 21/04
                                                                   726/16
2008/0022087 A1* 1/2008 Tsujimoto ............. G06F 21/608
                                                                   713/155
(Continued)

FOREIGN PATENT DOCUMENTS

JP        2005-303565 A    10/2005
JP        2007-079693 A    3/2007
(Continued)

OTHER PUBLICATIONS

Andrei Oliveira da Silva; Providing Printing Web Services; CPSE—Research Center on Embedded Software Av. Ipiranga, 6681—Prédio 30—Bloco 4—Sala 242 90619-900 Porto Alegre, Brazil; p. 1-5 (Year: 2002).*

*Primary Examiner* — Monjur Rahim
(74) *Attorney, Agent, or Firm* — Scully Scott Murphy & Presser, P.C.

(57) ABSTRACT

In a copy method, a first processing apparatus performs: receiving authentication information from a mobile terminal; storing the received authentication information into an external storage medium connected to a first interface of the first processing apparatus; and storing particular information stored in a first storage of the first processing apparatus, into the external storage medium connected to the first interface. A second processing apparatus performs: receiving the authentication information from the mobile terminal; reading the authentication information stored in the external storage medium connected to a second interface of the second processing apparatus; and storing, into a second storage of the second processing apparatus, the particular information stored in the external storage medium connected
(Continued)

to the second interface, when the read authentication information and the received authentication information match each other.

8 Claims, 10 Drawing Sheets

(51) Int. Cl.
   *G06F 21/60* (2013.01)
   *H04L 9/32* (2006.01)
(52) U.S. Cl.
   CPC ............ *G06F 3/0683* (2013.01); *G06F 21/60* (2013.01); *H04L 9/32* (2013.01)
(58) Field of Classification Search
   USPC ........................................................ 713/150
   See application file for complete search history.

(56) References Cited

U.S. PATENT DOCUMENTS

| | | | |
|---|---|---|---|
| 2008/0201771 | A1* | 8/2008 | Ueda .................... H04L 9/3231 726/7 |
| 2013/0063761 | A1* | 3/2013 | Uchibori ............... G06F 3/1285 358/1.14 |
| 2015/0138597 | A1* | 5/2015 | Koshigaya ......... H04N 1/00973 358/1.15 |
| 2016/0014112 | A1* | 1/2016 | Gunning ............... H04W 12/06 713/159 |
| 2016/0014303 | A1* | 1/2016 | Utaka .................. H04N 1/4433 358/1.14 |

FOREIGN PATENT DOCUMENTS

| | | |
|---|---|---|
| JP | 2010-045739 A | 2/2010 |
| JP | 2011-021600 A | 2/2011 |
| JP | 2015-099565 A | 5/2015 |

\* cited by examiner

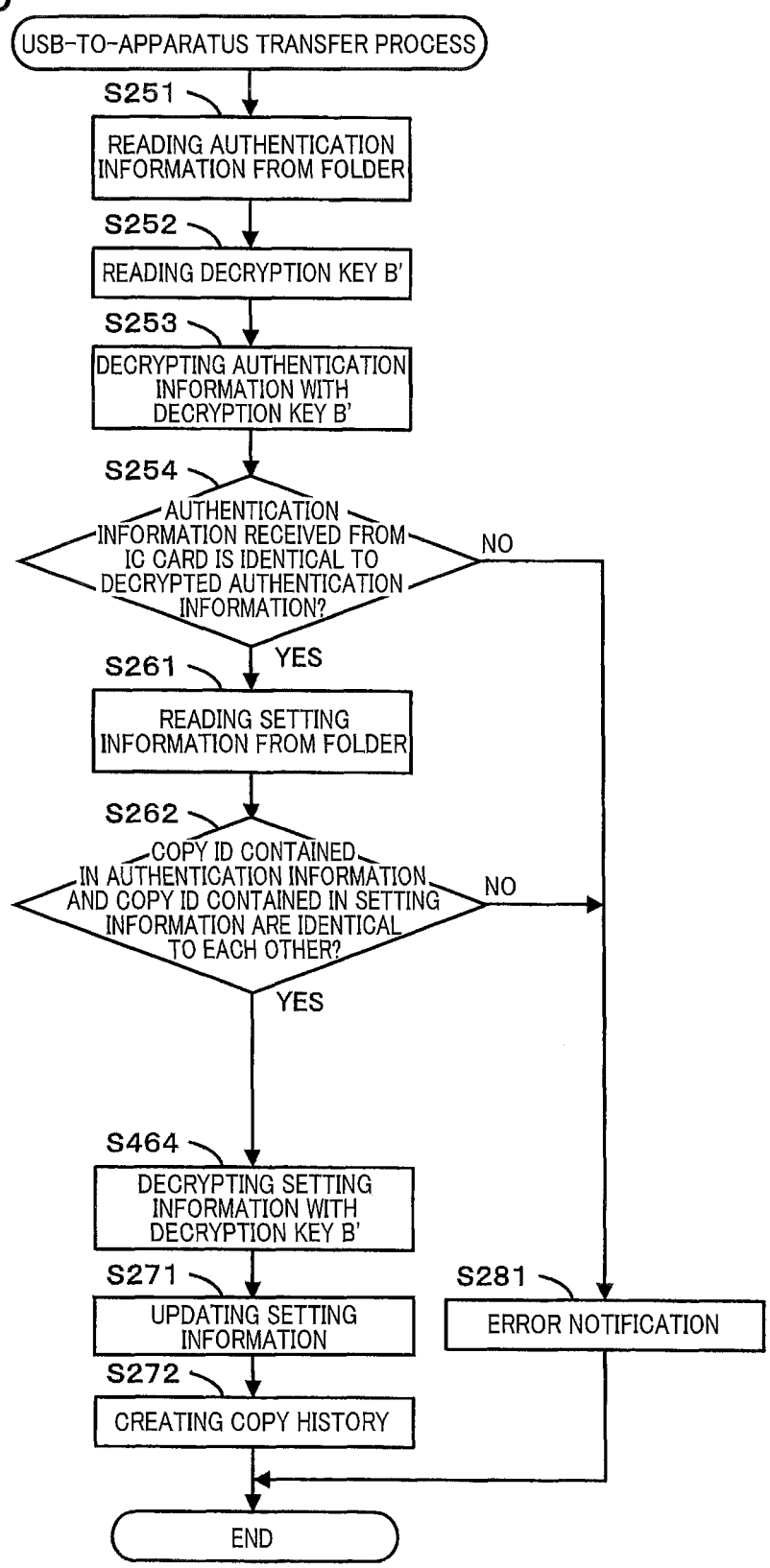

COPY METHOD OF COPYING INFORMATION BETWEEN FIRST PROCESSING APPARATUS AND SECOND PROCESSING APPARATUS, THE FIRST PROCESSING APPARATUS, AND THE SECOND PROCESSING APPARATUS

CROSS REFERENCE TO RELATED APPLICATION

The present application claims priority from Japanese Patent Application No. 2016-193826, which was filed on Sep. 30, 2016, the disclosure of which is herein incorporated by reference in its entirety.

BACKGROUND

The following disclosure relates to a copy method of copying information via a storage medium between a first processing apparatus and a second processing apparatus, to the first processing apparatus, and to the second processing apparatus.

There are known techniques of storing information from a storage medium to a processing apparatus. In one example of such techniques, setting information about a function executable by a processing apparatus is stored in advance in a mobile terminal including a non-contact wireless communication device, thereafter an authentication processing is executed over non-contact wireless communication, and when the non-contact wireless communication is established, the setting information is transmitted from the mobile terminal to the processing apparatus over the non-contact wireless communication.

SUMMARY

However, there is a problem in the above-described technique. That is, before receiving the setting information from the mobile terminal, the processing apparatus executes the authentication processing based on information transmitted from the mobile terminal. This authentication processing is verification between the information transmitted from the mobile terminal and information that is set for the processing apparatus in advance. Thus, settings for the authentication processing need to be finished on the processing apparatus. Alternatively, even in the case where the authentication processing is executed in an external server such as an authentication server, at least connection settings between the processing apparatus and the authentication server need to be finished in advance. Thus, in the case where information is stored into a processing apparatus in which preliminary settings required for the authentication processing are not performed as in the case of introduction of new apparatuses, a user has to take trouble to finish the preliminary settings.

Accordingly, an aspect of the disclosure relates to a technique for reducing trouble for a user when information is stored into a processing apparatus via a portable storage medium.

One aspect of the disclosure relates to a copy method of copying information between a first processing apparatus and a second processing apparatus. The first processing apparatus includes: a first storage; a first receiver configured to receive a signal from a mobile terminal having a non-contact wireless communication function; a first interface connectable to an external storage medium; and a processor. The second processing apparatus includes: a second storage; a second receiver configured to receive a signal from the mobile terminal; a second interface connectable to the external storage medium; and a processor. The copy method includes steps performed by the processor of the first processing apparatus. The steps performed by the processor of the first processing apparatus include: a first receiving step of causing the first receiver to receive authentication information from the mobile terminal; a first authentication-information storing step of storing the authentication information received in the first receiving step, into the external storage medium connected to the first interface; and a first particular-information storing step of storing particular information stored in the first storage, into the external storage medium connected to the first interface. The particular information is usable in both of the first processing apparatus and the second processing apparatus. The copy method further includes steps performed by the processor of the second processing apparatus. The steps performed by the processor of the second processing apparatus include: a second receiving step of causing the second receiver to receive the authentication information from the mobile terminal; a reading step of reading the authentication information stored in the external storage medium connected to the second interface; and a second particular-information storing step of storing, into the second storage, the particular information stored in the external storage medium connected to the second interface, when the authentication information read in the reading step and the authentication information received in the second receiving step match each other.

In another aspect of the disclosure, a first processing apparatus includes: a first storage; a first receiver configured to receive a signal from a mobile terminal having a non-contact wireless communication function; a first interface connectable to an external storage medium; and a processor. The processor is configured to control the first processing apparatus to: cause the first receiver to receive authentication information from the mobile terminal; store the received authentication information into the external storage medium connected to the first interface; and store particular information stored in the first storage, into the external storage medium connected to the first interface.

In yet one aspect of the disclosure, a second processing apparatus includes: a second storage; a second receiver configured to receive a signal from the mobile terminal; a second interface connectable to the external storage medium; and a processor. The processor is configured to control the second processing apparatus to: cause the second receiver to receive authentication information from the mobile terminal; read the authentication information stored in the external storage medium connected to the second interface; and store, into the second storage, the particular information stored in the external storage medium connected to the second interface, when the read authentication information and the received authentication information match each other.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 10 is a flow chart illustrating a procedure of a USB-to-apparatus transfer process in the modification.

DETAILED DESCRIPTION OF THE EMBODIMENTS

Hereinafter, there will be described copy methods according to embodiments by reference to the drawings. The present disclosure is applied to a data copy system including: a plurality of multi-function peripherals (MFPs); an IC card communicable wirelessly with the MFPs; and a flash memory connectable to a MFP 100.

Overall Configuration of Data Copy System

Figure 1:
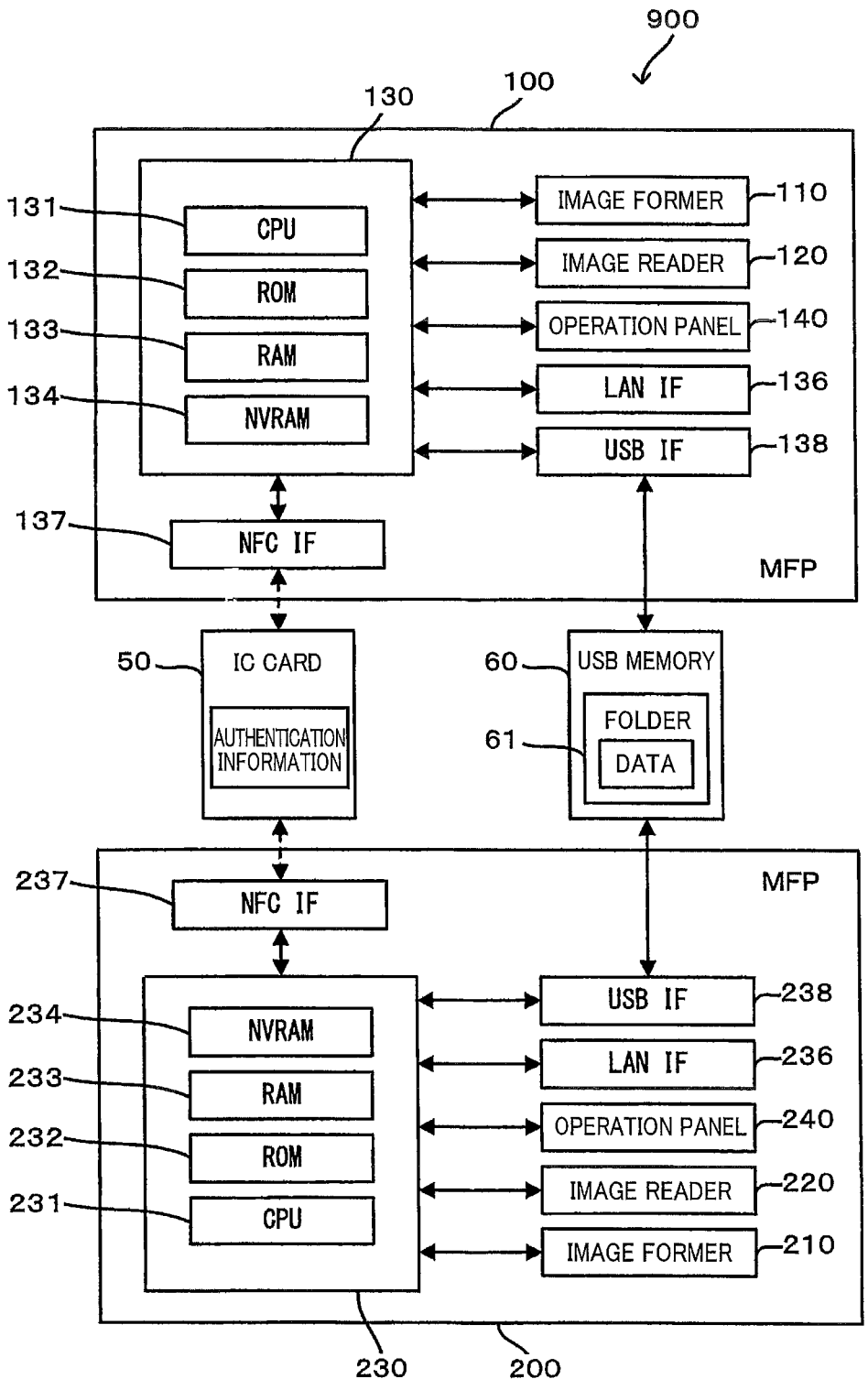
FIG. 1 is a block diagram illustrating a configuration of a data copy system.

In the present embodiment, as illustrated in FIG. 1, a data copy system 900 includes: the MFP 100 as a copy source; a MFP 200 as a copy destination; an IC card 50; and a USB memory 60. The MFP 100 is one example of a first processing apparatus. The MFP 200 is one example of a second processing apparatus. The copy source is a device a user wants to copy data from, and the copy destination is a device the user wants to copy the data to.

In the data copy system 900, various kinds of setting information stored in the MFP 100 can be copied to the MFP 200 via the USB memory 60. Also, in the data copy system 900, user authentication is performed using the IC card 50 when the various kinds of setting information stored in the MFP 100 are written into the USB memory 60 and when the various kinds of setting information stored in the USB memory 60 are written into the MFP 200.

In the present embodiment, the MFP 100 and the MFP 200 are of the same model and have the same hardware configuration. Thus, information stored in the MFP 200 can also be copied to the MFP 100. In this case, the MFP 200 is one example of the first processing apparatus, and the MFP 100 is one example of the second processing apparatus. That is, each of the MFPs 100, 200 serves as the first processing apparatus and the second processing apparatus.

The processing apparatus as the copy destination is not limited to the MFP 200 and may be a plurality of processing apparatuses capable of performing a copy operation in the copy system in the present embodiment. That is, the processing apparatus as the copy destination is not limited to only the MFP 200.

Configuration of MFP

There will be next explained an overall configuration of the MFP 100. Since the MFP 100 and the MFP 200 are of the same model and have the same hardware configuration as described above, an explanation for the MFP 200 is omitted.

As illustrated in FIG. 1, the MFP 100 includes a controller 130. The controller 130 includes a CPU 131, a ROM 132, a RAM 133, and a non-volatile (non-transitory) RAM (NVRAM) 134. The MFP 100 further includes an image former 110, an image reader 120, an operation panel 140, a LAN interface 136, a near-field-communication (NFC) interface 137, and a USB interface 138. These devices are controlled by the CPU 131. The controller 130 in FIG. 1 is a generic collective name for various kinds of hardware used for control of the MFP 100 such as the CPU 131 and may not be a single piece of hardware provided in the MFP 100 in reality.

The ROM 132 stores a firmware, settings, and initial values, for example. The firmware is a control program for controlling the MFP 100. The RAM 133 is used as a working area from which various kinds of control programs are read or as a storage area for temporarily storing image data. The NVRAM 134 is also used as a storage area for storing various kinds of information used in the MFP 100. In particular, the NVRAM 134 is used as a storage area for storing information required to be stored even after the MFP 100 is turned off. Examples of such information include a phone book, network settings, and shortcut settings. The NVRAM 134 is one example of a first storage. An NVRAM 234 of the MFP 200 is one example of a second storage. It is noted that the RAM 133 and a RAM 233 of the MFP 200 may be examples of the first storage and the second storage, respectively.

The CPU 131 controls the devices of the MFP 100 while storing results of processings into the RAM 133 or the NVRAM 134, according to the control program read from the ROM 132 and signals transmitted from various kinds of sensors. The CPU 131 is one example of a processor, and a CPU 231 of the MFP 200 is another example of the processor. The controller 130 may be one example of the processor, and a controller 230 of the MFP 200 may be one example of the processor.

The image former 110 prints an image on a sheet based on image data. The image former 110 at least needs to form an image to print the image on the sheet and may be any of an ink-jet image forming device and an electronic photographic image forming device. The image former 110 may be any of a device capable of forming color images and a device only capable of forming monochrome images.

The image reader 120 reads an image formed on a document to output image data. The image reader 120 at least needs to read an image formed on a document and may be performed using any of a contact image sensor (CIS) and a charged-coupled device (CCD). The image reader 120 may be any of a device capable of performing color reading and a device only capable of performing black and white reading.

The LAN interface (LAN IF) 136 is an interface via which a cable used for communication over Ethernet (registered trademark) is connected to the MFP 100. The MFP 100 receives data transmitted from an external device, via the LAN interface 136. Also, the MFP 100 transmits data to the external device via the LAN interface 136.

The NFC interface 137 enables NFC wireless communication (NFC communication) according to ISO/IEC21481 or ISO/IEC18092. The MFP 100 receives data transmitted from the external device, via the NFC interface 137. Also, the MFP 100 transmits data to the external device via the NFC interface 137. The NFC interface 137 is one example of a first receiver, and an NFC interface 237 of the MFP 200 is one example of a second receiver.

For example, in the case where the user possesses the IC card 50 storing the authentication information, when the IC card 50 is brought within a communication area of the NFC interface 137, the MFP 100 is allowed to transfer data to and from the IC card 50 via the NFC interface 137, that is, the MFP 100 is allowed to receive the authentication information from the IC card 50. Likewise, the IC card 50 is brought within a communication area of an NFC interface 237 of the MFP 200, the MFP 200 is allowed to receive the authentication information from the IC card 50 via the NFC interface 237. The IC card 50 is one example of a mobile terminal.

The USB interface 138 is an interface via which a device including a USB connector is connected to the MFP 100. The MFP 100 reads and writes data from and to the device connected to the MFP 100 via the USB interface 138. The USB interface 138 is one example of a first interface, and a USB interface 238 of the MFP 200 is one example of a second interface.

For example, in the case where the user possesses the USB memory 60 as a flash memory having a USB connector, when the USB memory 60 is connected to the USB interface 138, the MFP 100 is allowed to write data into a storage area of the USB memory 60 via the USB interface 138 and read data from the USB memory 60. The USB memory 60 is one example of an external storage medium.

The MFP 100 may include other interfaces, examples of which include: a wireless LAN interface for wireless LAN communication; and a telephone line interface for facsimile (FAX) communication with a facsimile machine connected to a telephone network via a telephone line.

Figure 2:
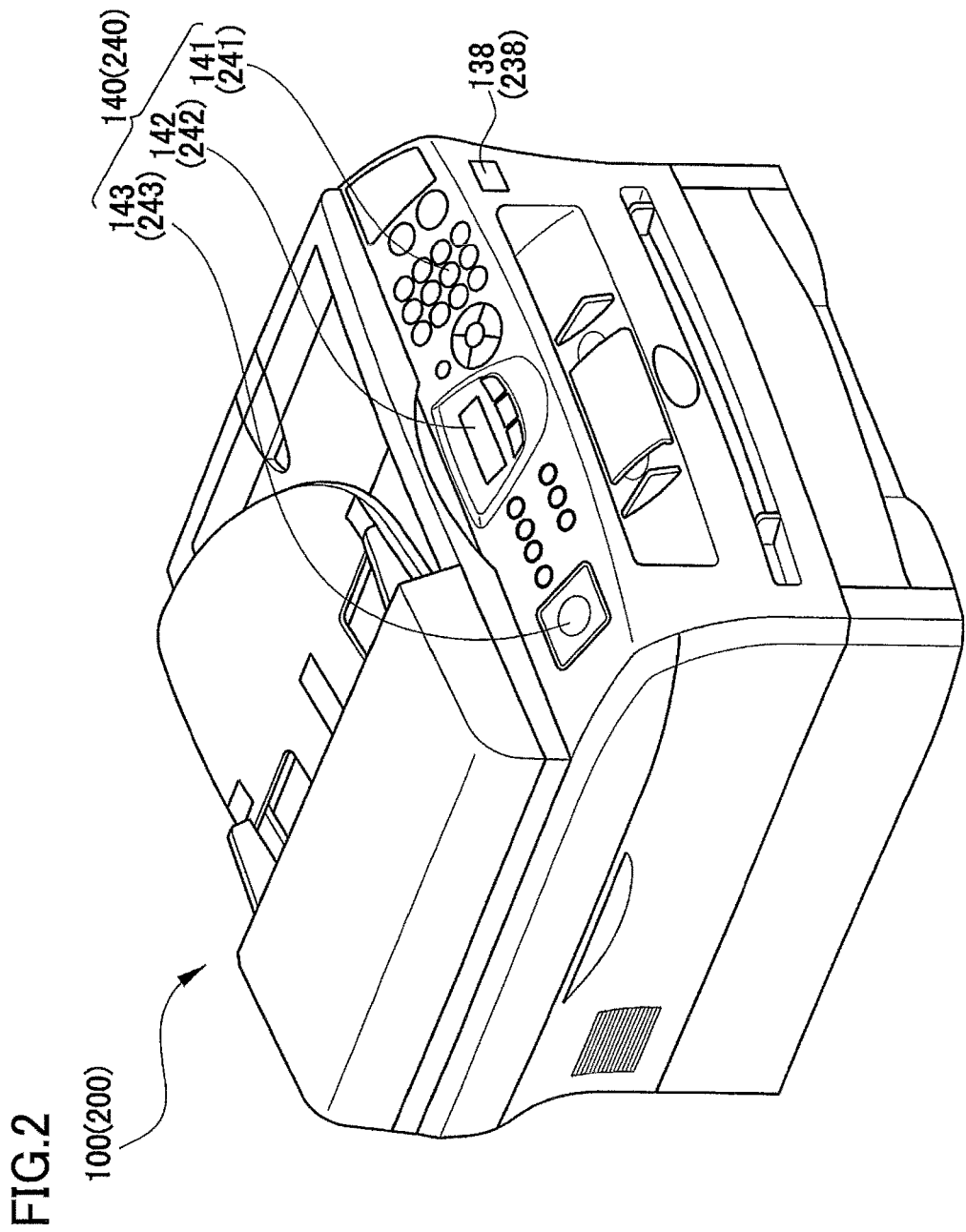
FIG. 2 is a perspective view of a multi-function peripheral (MFP) according to one embodiment.

As illustrated in FIG. 2, the operation panel 140 is provided on an exterior of the MFP 100 and includes: an input device 141 including various kinds of buttons for input from the user; and a screen 142 configured to display a message and settings of the MFP 100, for example. Examples of the buttons include: an OK button for instructing a start of an image processing; and a cancel button for instructing a cancel of the image processing. It is noted that the MFP 200 is similar in construction to the MFP 100, and the parenthesized numerals in FIG. 2 indicate the components of the MFP 200.

The operation panel 140 includes an NFC reader 143 configured to accept NFC communication. The NFC interface 137 is provided just under the NFC reader 143. In a state in which electric power is supplied to the MFP 100, the MFP 100 detects a device capable of performing the NFC communication, based on signals periodically output from the NFC interface 137. Thus, when the user holds the IC card 50 over the NFC reader 143, for example, the MFP 100 detects the IC card 50 and automatically enables the NFC communication between the IC card 50 and the MFP 100. It is noted that holding the IC card 50 over the NFC reader 143 is an operation of bringing the IC card 50 within the communication area of the NFC interface 137, and the IC card 50 and the NFC reader 143 may or may not be brought into contact with each other.

Copy Operation

Figure 3:
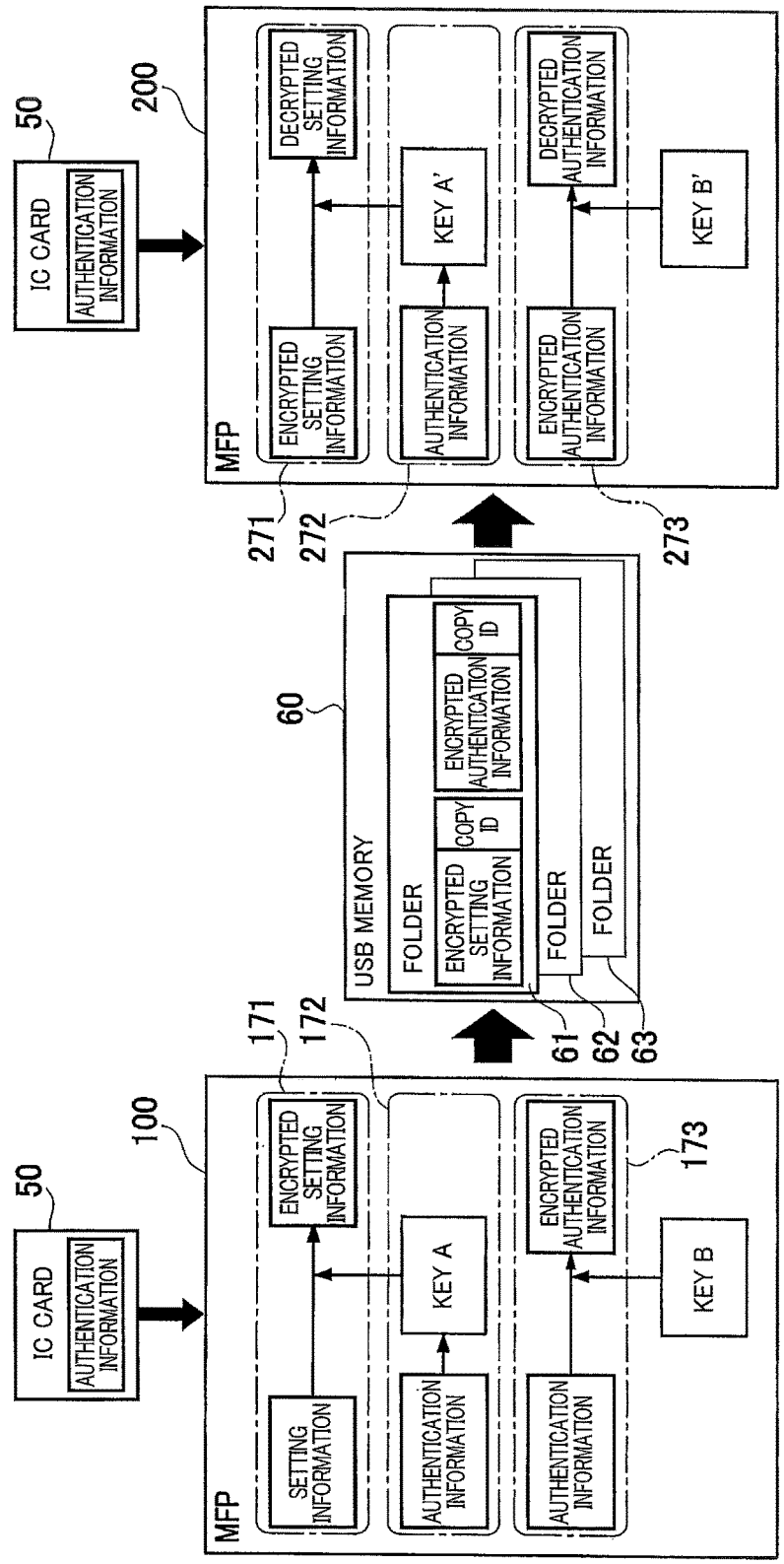
FIG. 3 is a view for explaining an overview of a copy operation performed in the data copy system.

There will be next explained, with reference to FIG. 3, the copy operation in the data copy system 900 in the present embodiment. In the present embodiment, the data copy system 900 uses the USB memory 60 and the IC card 50 when the various kinds of setting information stored in the MFP 100 are copied to the MFP 200. Examples of the setting information include a phone book, network settings, shortcut settings, and tray settings.

The ROM 132 of the MFP 100 stores: an encryption program 171 for encrypting the setting information; a key creating program 172 for creating an encryption key; and an encryption program 173 for encrypting the authentication information. It is noted that the MFP 200 also stores similar programs, which are however not illustrated because the MFP 200 serves as the copy destination in this explanation.

A ROM 232 of the MFP 200 stores: a decryption program 271 for decrypting the encrypted setting information; a key creating program 272 for creating a decryption key; and a decryption program 273 for decrypting the encrypted authentication information. It is noted that the MFP 100 also stores similar programs, which are however not illustrated because the MFP 100 serves as the copy source in this explanation.

In the data copy system 900, when the copy operation begins, the MFP 100 accepts input of a copy start instruction via the operation panel 140. When the copy start instruction is input by the user, the MFP 100 instructs the user to hold the IC card 50 over the NFC reader 143. When the user holds the IC card 50 over the NFC reader 143, the MFP 100 receives the authentication information from the IC card 50 via the NFC interface 137.

After receiving the authentication information from the IC card 50 via the NFC interface 137, the MFP 100 creates an encryption key A based on the authentication information according to the key creating program 172. The encryption key A is unique to the user because the encryption key A is created based on the authentication information.

After the creation of the encryption key A, the MFP 100 uses the encryption key A to encrypt the setting information according to the encryption program 171. Also, the ROM 132 stores an encryption key B in advance, and when the MFP 100 receives the authentication information from the IC card 50 via the NFC interface 137, the MFP 100 uses the encryption key B to encrypt the authentication information according to the encryption program 173. The encryption key B is stored at shipment from a factory, for example, and shared by all the models. It is noted that the MFP 200 also stores the encryption key A, but an illustration thereof is omitted.

After the completion of the encryption of the setting information and the authentication information, the MFP 100 stores the encrypted setting information and the encrypted authentication information into the USB memory 60 via the USB interface 138. When the MFP 100 stores the information into the USB memory 60, the MFP 100 creates a folder 61 in the USB memory 60 for the copy operation at this time and stores the encrypted setting information and the encrypted authentication information into the folder 61. Folders 62, 63 in FIG. 3 are already-existing folders. That is, the USB memory 60 contains the three folders 61, 62, 63 as a result of the copy operation at this time.

When storing the encrypted setting information and the encrypted authentication information into the USB memory 60, the MFP 100 assigns a copy ID to both of the encrypted setting information and the encrypted authentication information. The copy ID is identification information shared by the encrypted setting information and the encrypted authentication information. As a result, the encrypted setting information and the encrypted authentication information are associated with each other.

After the encrypted setting information and the encrypted authentication information are stored into the USB memory 60, the user removes the USB memory 60 from the USB interface 138 of the MFP 100 and moves to the MFP 200 to insert the USB memory 60 into the USB interface 238 of the MFP 200.

The MFP 200 accepts input of a copy instruction via an operation panel 240 of the MFP 200. When the copy instruction is input by the user, as in the operation of the MFP 100, the MFP 200 controls the screen 142 of the operation panel 140 to display an instruction for the user to hold the IC card 50 over an NFC reader 243 of the MFP 200. When the user holds the IC card 50 over the NFC reader 243, the MFP 200 receives the authentication information stored in the IC card 50 via the NFC interface 237. The MFP 200 then reads the encrypted setting information and the encrypted authentication information stored in the USB memory 60.

The ROM 232 stores a decryption key B' in advance. The decryption key B' corresponds to the encryption key B stored in the MFP 100. When the MFP 200 reads the encrypted authentication information from the USB memory 60, the MFP 200 uses the decryption key B' to decrypt the encrypted authentication information according to the decryption program 273. That is, the MFP 200 changes the authentication information back to its original state established before the encryption. In the case where the encrypted authentication information is not encrypted with the encryption key B corresponding to the decryption key B', the decryption fails. In this case, the authentication information before the encryption cannot be used, thereby preventing inappropriate copy. It is noted that the MFP 100 also stores the decryption key B', but an illustration thereof is omitted.

When the MFP 200 receives the authentication information from the IC card 50 via the NFC interface 237 and when the decrypted authentication information matches the authentication information received from the IC card 50 via the NFC interface 237, the MFP 200 creates a decryption key A', based on the decrypted authentication information or the authentication information received from the IC card 50, according to the key creating program 272. The decryption key A' is unique to the user because the decryption key A' is created based on the authentication information.

After the creation of the decryption key A', the MFP 200 uses the decryption key A' to decrypt the encrypted setting information according to the decryption program 271. That is, the MFP 200 changes the setting information back to its original state established before the encryption. In the case where the decryption key A' is created based on authentication information different from that used for creating the encryption key A, the decryption fails. In this case, the setting information before the encryption cannot be used, thereby preventing inappropriate copy. After the decryption of the setting information, the setting information of the MFP 200 is overwritten with the decrypted setting information. That is, the setting information stored in the MFP 100 is copied to the MFP 200.

In the copy operation in the data copy system 900, user authentication is performed using the decrypted authentication information and the authentication information received from the IC card 50 via the NFC interface 237. When the decrypted authentication information and the authentication information received from the IC card 50 match each other, the MFP 200 overwrites the setting information stored in the MFP 200 with the decrypted setting information. When the decrypted authentication information and the authentication information received from the IC card 50 do not match each other, the MFP 200 does not overwrite the setting information stored in the MFP 200 with the decrypted setting information, thereby preventing inappropriate copy.

Processings Executed by MFP 100 as Copy Source

Figure 4:
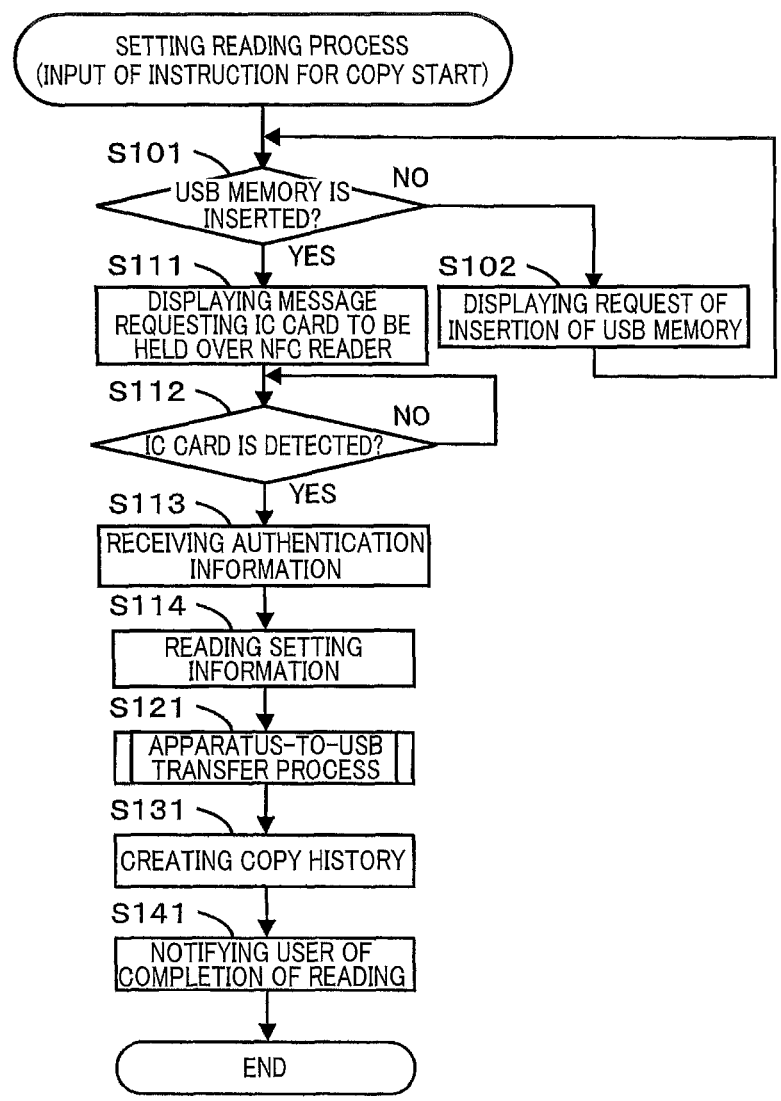
FIG. 4 is a flow chart illustrating a procedure of a setting reading process executed by the MFP as a copy source.

There will be next explained a setting reading process executed by the MFP 100 as the copy source with reference to the flow chart in FIG. 4. The setting reading process is executed by the CPU 131 of the MFP 100 when the copy start instruction is input via the operation panel 140.

The setting reading process begins with S101 at which the CPU 131 determines whether the USB memory 60 is inserted in the USB interface 138. When the CPU 131 determines that the USB memory 60 is not inserted (S101: NO), the CPU 131 at S102 controls the screen 142 of the operation panel 140 to display a message requesting the user to insert the USB memory 60. After the processing at S102, this flow returns to S101 at which the CPU 131 determines again whether the USB memory 60 is inserted in the USB interface 138.

When the CPU 131 determines that the USB memory 60 is inserted in the USB interface 138 (S101: YES), the CPU 131 at S111 controls the screen 142 of the operation panel 140 to display a message requesting the user to hold the IC card 50 over the NFC reader 143. After the processing at S111, the CPU 131 at S112 determines whether the IC card 50 is detected. When the CPU 131 determines that the IC card 50 is not detected (S112: NO), the CPU 131 waits for detection of the IC card 50.

When the CPU 131 determines that the IC card 50 is detected (S112: YES), the CPU 131 at S113 receives the authentication information from the IC card 50 via the NFC interface 137 over the NFC communication with the IC card 50. The processing at S113 is one example of a first receiving step. When the authentication information cannot be received, the CPU 131 waits for new detection of the IC card 50.

After the processing at S113, the CPU 131 at S114 reads setting information as a copy target from the ROM 132, the RAM 133, or the NVRAM 134. The setting information as the copy target may be predetermined information and may be one of a plurality of pieces of information which is selected by the user.

After the processing at S114, the CPU 131 at S121 executes an apparatus-to-USB transfer process for storing the setting information stored in the MFP 100, into the USB memory 60. The apparatus-to-USB transfer process will be described later in detail.

After the apparatus-to-USB transfer process at S121, the CPU 131 at S131 creates a copy history. The copy history contains: information indicating that the setting information has been stored in the USB memory 60; the date and time at which the setting information is stored in the USB memory 60; the authentication information received from the IC card 50 via the NFC interface 137; and a type of the setting information stored in the USB memory 60, for example. The created copy history is stored into the NVRAM 134. The processing at S131 is one example of a history storing step.

After the processing at S131, the CPU 131 at S141 notifies the user of the completion of the reading of the setting information. For example, the CPU 131 controls the screen 142 of the operation panel 140 to display a message indicating the completion of the reading of the setting information. After the processing at S141, the setting reading process ends.

Figure 5:
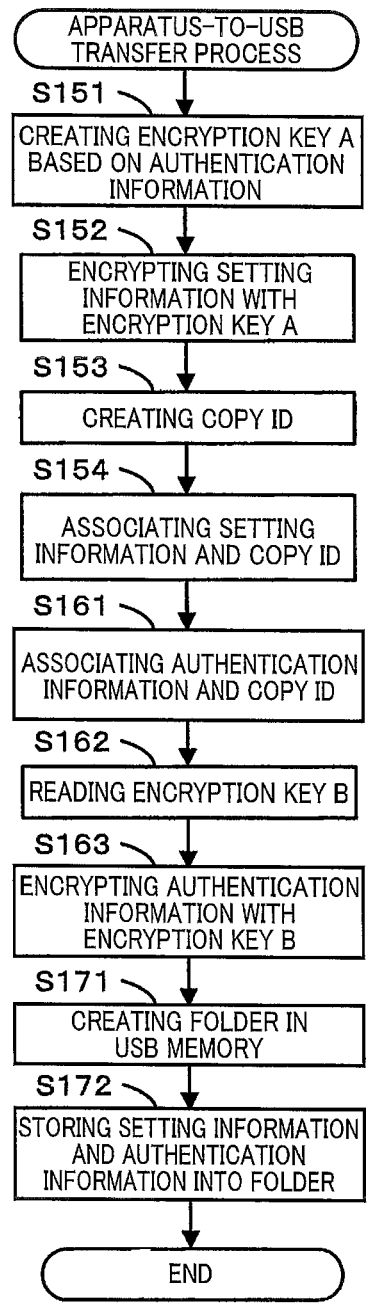
FIG. 5 is a flow chart illustrating a procedure of an apparatus-to-USB transfer process executed by the MFP as the copy source.
Figure 6:
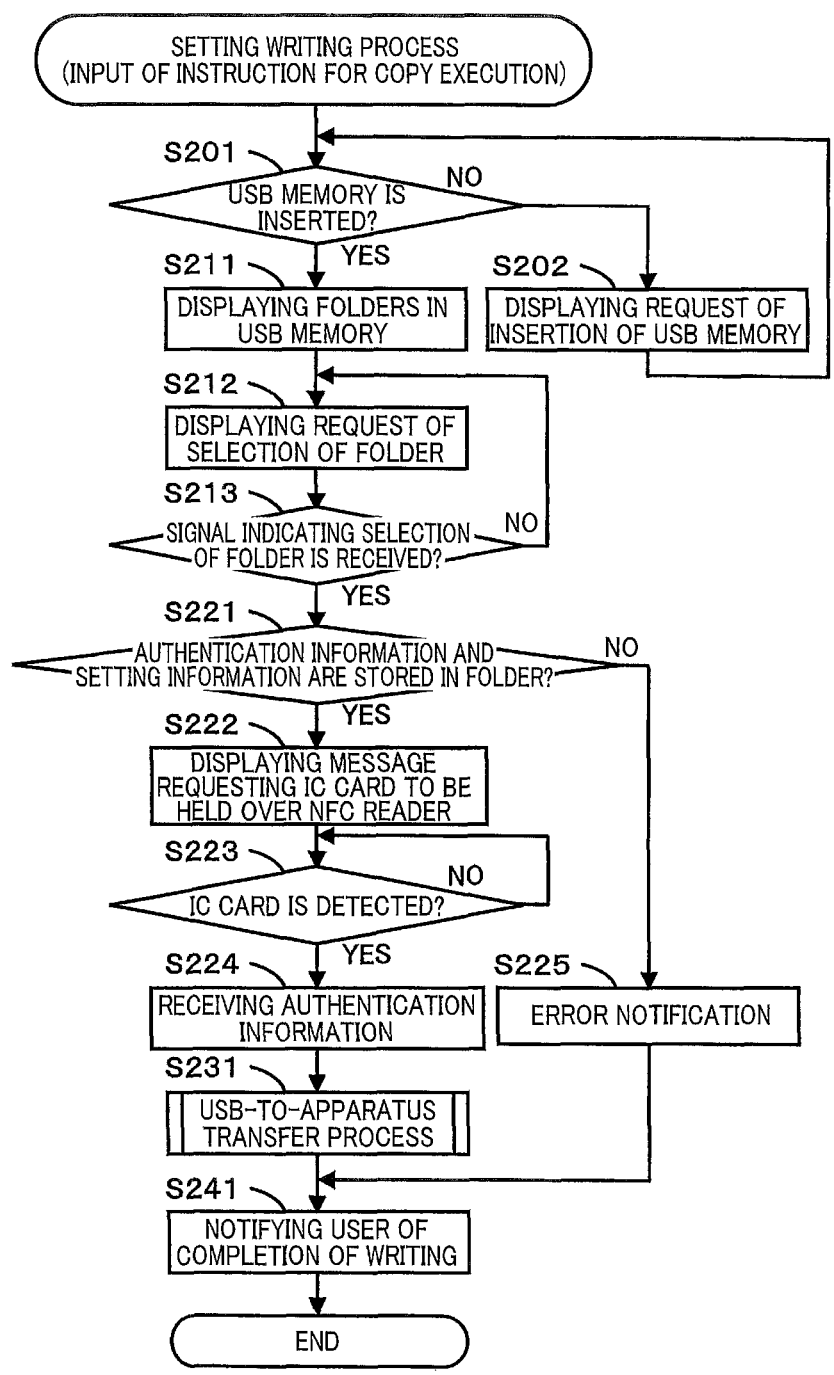
FIG. 6 is a flow chart illustrating a procedure of a setting writing process executed by the MFP as a copy destination.

There will be next explained, with reference to the flow chart in FIG. 5, a procedure of the apparatus-to-USB transfer process at S121 in the setting reading process.

The apparatus-to-USB transfer process begins with S151 at which the CPU 131 creates the encryption key A based on the authentication information received from the IC card 50 via the NFC interface 137. The processing at S151 is one example of an encryption-key creating step. The CPU 131 at S152 uses the encryption key A to encrypt the setting information as the copy target. The processing at S152 is one example of a first encrypting step.

After the processing at S152, the CPU 131 at S153 creates a copy ID for identifying a copy job, individually. The CPU 131 at S154 associates the copy ID with the encrypted setting information and creates copy-source setting information constituted by the encrypted setting information and the copy ID.

After the processing at S154, the CPU 131 at S161 associates the copy ID created at S153, with the authentication information received from the IC card 50 and creates copy-source authentication information constituted by the authentication information and the copy ID.

After the processing at S161, the CPU 131 at S162 reads the encryption key B from the ROM 132. The CPU 131 at S163 uses the encryption key B to encrypt the copy-source authentication information created at S161. The processing at S163 is one example of a second encrypting step.

After the processing at S163, the CPU 131 at S171 creates the folder 61 in the USB memory 60. In the present embodiment, the CPU 131 automatically creates a folder with a name including the name of the MFP 100 and the date and time of the creation of the folder. Specifically, in the case where the name of the MFP 100 is MFP-X, and the date and time of the creation of the folder is Oct. 1, 2016, the CPU 131 sets "MFP-X20161001" as the folder name. It is noted that the user may determine the folder name as desired. This configuration makes it easy for the user to select the folder on the MFP 200. In the case where the MFP 100 automatically determines the folder name, there is no trouble for the user to input the folder name. The processing at S171 is one example of a folder creating step.

After the processing at S171, the CPU 131 at S172 stores the copy-source setting information and the copy-source authentication information into the folder 61 created at S171. That is, both of the encrypted setting information and the encrypted authentication information are stored into the one folder 61. It is noted that the copy ID contained in the copy-source setting information is not encrypted, and the copy ID contained in the copy-source authentication information is encrypted with the authentication information. The processing at S172 is one example of a first authentication-information storing step and a first particular-information storing step. After the processing at S172, the apparatus-to-USB transfer process ends.

Processings Executed by MFP 200 as Copy Destination

A setting writing process is executed by the CPU 231 of the MFP 200 when the copy instruction is input via the operation panel 240.

The setting writing process begins with S201 at which the CPU 231 determines whether the USB memory 60 is inserted in the USB interface 238. When the CPU 231 determines that the USB memory 60 is not inserted (S201: NO), the CPU 231 at S202 controls a screen 242 of the operation panel 240 to display a message requesting the user to insert the USB memory 60. After the processing at S202, this flow returns to S201 at which the CPU 231 determines whether the USB memory 60 is inserted in the USB interface 238.

When the CPU 231 determines that the USB memory 60 is inserted in the USB interface 238 (S201: YES), the CPU 231 at S211 controls the screen 242 of the operation panel 240 to display a list of the names of all the folders created in the USB memory 60.

After the processing at S211, the CPU 231 at S212 controls the screen 242 of the operation panel 240 to display a message requesting selection of a folder containing the copy target. The CPU 231 at S213 controls whether a signal indicating that the folder has been selected is received via the operation panel 240. When the operation panel 240 is operated by the user, the operation panel 240 outputs, to the controller 230, a signal indicating a selected one of the folders displayed on the screen 242. When the CPU 231 determines that the signal indicating that the folder has been selected is not received (S213: NO), this flow returns to S212 at which the CPU 231 keeps controlling the screen 242 of the operation panel 240 to display the message requesting the selection of the folder containing the copy target. It is noted that in the case where only one folder is stored in the USB memory 60, the processings at S212 and S213 may be omitted.

When the CPU 231 determines that the signal indicating that the folder has been selected is received (S213: YES), the CPU 231 at S221 determines whether both of the authentication information and the setting information are stored in the selected folder. When at least one of the authentication information and the setting information is not stored in the selected folder (S221: NO), the CPU 231 at S225 notifies the user of an error. For example, the CPU 231 controls the screen 242 of the operation panel 240 to display error information indicating that an inappropriate folder has been selected.

When the CPU 231 determines that both of the authentication information and the setting information are stored in the selected folder (S221: YES), the CPU 231 at S222 controls the screen 242 of the operation panel 240 to display a message requesting the user to hold the IC card 50 over the NFC reader 243. After the processing at S222, the CPU 231 at S223 determines whether the IC card 50 is detected via the NFC interface 237. When the CPU 231 determines that the IC card 50 is not detected via the NFC interface 237 (S223: NO), the CPU 231 waits for detection of the IC card 50.

When the CPU 231 determines that the IC card 50 is detected (S223: YES), the CPU 231 at S224 receives the authentication information from the IC card 50 via the NFC interface 237 over the NFC communication with the IC card 50. The processing at S224 is one example of a second receiving step. When the authentication information cannot be received, the CPU 231 waits for new detection of the IC card 50.

After the processing S224, the CPU 231 at S231 executes a USB-to-apparatus transfer process in which the CPU 231 reads the setting information from the selected folder stored in the USB memory 60 and overwrites the setting information stored in the MFP 200 with the read setting information. The USB-to-apparatus transfer process will be described later in detail.

After the processing at S231 or S225, the CPU 231 at S241 notifies the user of the completion of the writing of the setting information. For example, in the case where the writing of the setting information is succeeded, the CPU 231 controls the screen 242 of the operation panel 240 to display a message indicating the completion of the writing of the setting information. In the case where the writing of the setting information is failed, the CPU 231 controls the screen 242 of the operation panel 240 to display a message indicating a failure of the writing of the setting information. After the processing at S241, the setting writing process ends.

Figure 7:
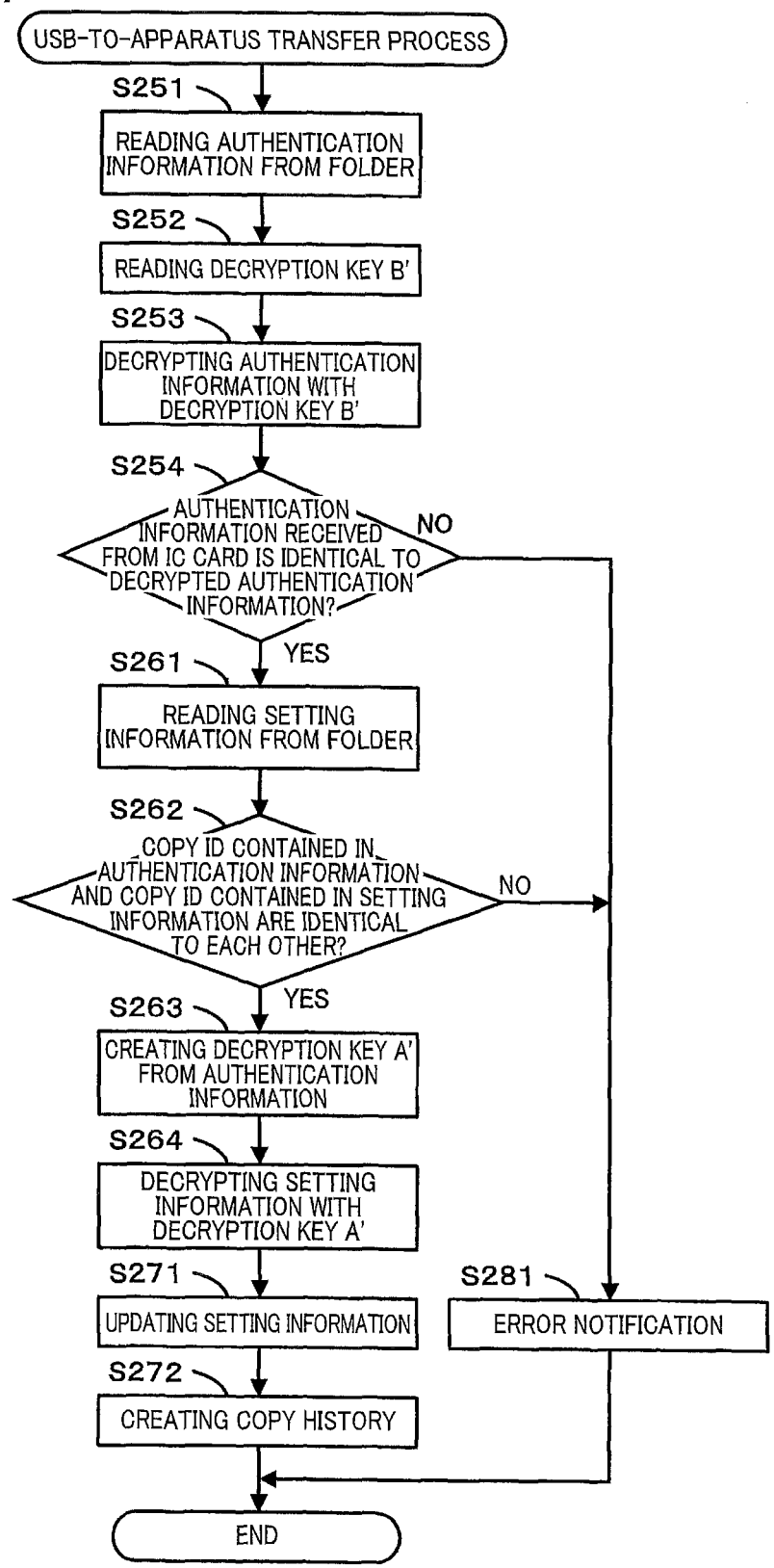
FIG. 7 is a flow chart illustrating a procedure of a USB-to-apparatus transfer process executed by the MFP as the copy destination.

There will be next explained, with reference to the flow chart in FIG. 7, a procedure of the USB-to-apparatus transfer process at S231 in the setting writing process.

The USB-to-apparatus transfer process begins with S251 at which the CPU 231 reads the copy-source authentication information from the selected folder of the USB memory 60. The read copy-source authentication information is information created by encrypting the copy ID and the authentication information with the encryption key B. The processing at S251 is one example of a reading step.

The CPU 231 at S252 reads the decryption key B' from the ROM 232. The CPU 231 at S253 uses the decryption key B' to decrypt the copy-source authentication information. In this processing, the authentication information received by the MFP 100 via the NFC interface 137 and the copy ID created the MFP 100 are decrypted. The processing at S253 is one example of a second decrypting step.

After the processing at S253, the CPU 231 at S254 determines whether the authentication information received from the IC card 50 via the NFC interface 237 is identical to the authentication information read from the USB memory 60. That is, the CPU 231 executes the user authentication by performing verification between the authentication information read from the USB memory 60 and the authentication information received from the IC card 50 via the NFC interface 237. When the CPU 231 determines that the received authentication information and the read authentication information are not identical to each other (S254: NO), the CPU 231 at S281 notifies the user of an error. For example, the CPU 231 controls the screen 242 of the operation panel 240 to display error information indicating that an inappropriate folder is selected or error information indicating that an inappropriate IC card is detected.

When the CPU 231 determines that the received authentication information and the read authentication information are identical to each other (S254: YES), the CPU 231 at S261 reads the copy-source setting information from the selected folder of the USB memory 60. The read copy-source setting information is information constituted by the copy ID and the setting information encrypted with the encryption key A.

The CPU 231 at S262 determines whether the copy ID contained in the copy-source authentication information and the copy ID contained in the copy-source setting information are identical to each other. When the CPU 231 determines that the two copy IDs are not identical to each other (S262: NO), the CPU 231 at S281 notifies the user of an error. For example, the CPU 231 controls the screen 242 of the operation panel 240 to display error information indicating that the file is not found.

When the CPU 231 determines that the two copy IDs are identical to each other (S262: YES), the CPU 231 at S263 creates the decryption key A' from the authentication information read from the USB memory 60 and decrypted. The processing at S263 is one example of a decryption-key creating step. The CPU 231 at S264 uses the decryption key A' to decrypt the encrypted setting information. In this processing, the setting information as the copy target is decrypted. The processing at S264 is one example of a first decrypting step.

It is noted that the decryption key A' is at S263 created based on the authentication information read from the USB memory 60 and decrypted, but since the decrypted authentication information and the authentication information received from the IC card 50 via the NFC interface 237 are identical to each other, the decryption key A' may be created based on the authentication information received from the IC card 50 via the NFC interface 237.

After the processing at S264, the CPU 231 at S271 uses the decrypted setting information to update the current setting information about the MFP 200. That is, the CPU 231 overwrites the current setting information with the decrypted setting information. The processings from S254 to S271 are one example of a second particular-information storing step.

After the processing at S271, the CPU 231 at S272 creates a copy history. The copy history contains: information indicating that the setting information has been overwritten; the date and time at which the setting information is overwritten; the authentication information read from the USB memory 60; and a type of the decrypted setting information with which the setting information is overwritten, for example. The created copy history is stored into the NVRAM 234. After the processing at S272 or S281, the USB-to-apparatus transfer process ends.

Modification of Copy Operation

Figure 8:
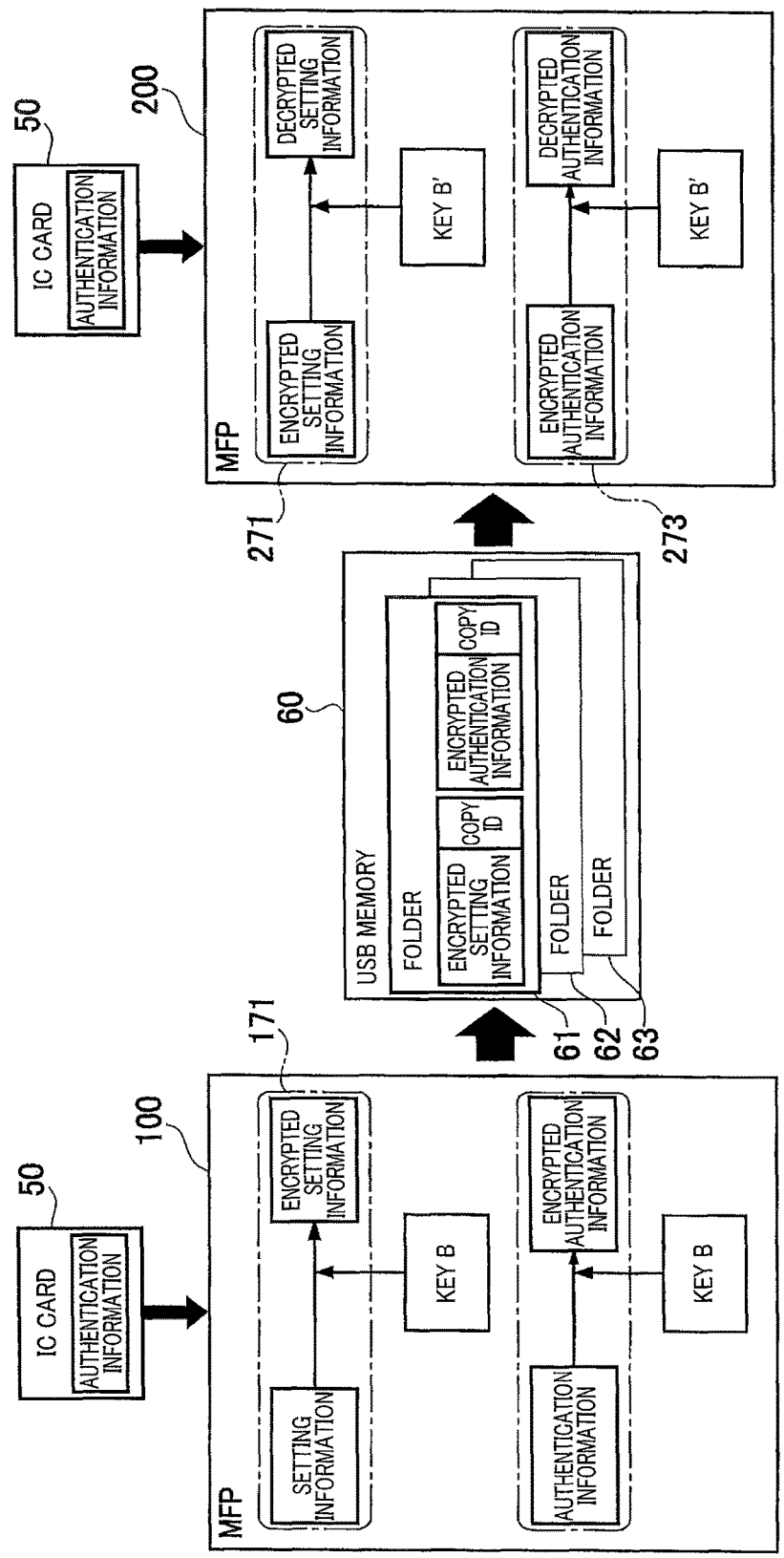
FIG. 8 is a view for explaining an overview of a copy operation in a modification.
Figure 9:
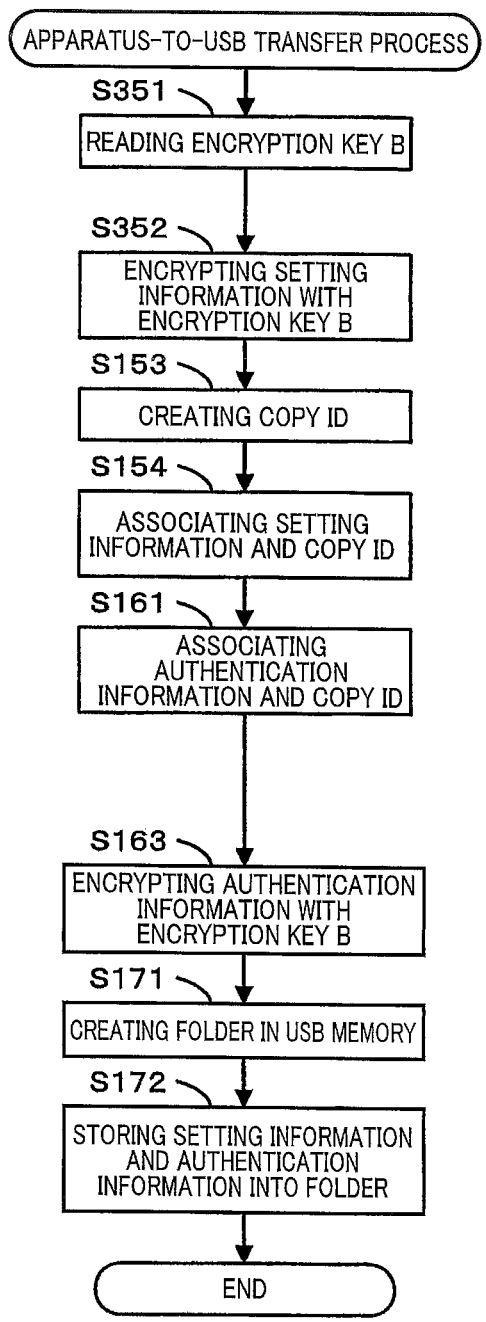
FIG. 9 is a flow chart illustrating a procedure of an apparatus-to-USB transfer process in the modification.

There will be next explained a modification of the copy operation in the data copy system 900 with reference to FIG. 8. In this modification, the setting information is encrypted with the encryption key B stored in the MFP. This configuration is different from the configuration in which the encryption key A created from the authentication information is used for encryption of the setting information. The following explanation will be provided, mainly focusing on the difference.

In this modification, as in the above-described embodiment, the MFP 100 as the copy source receives the authentication information from the IC card 50 via the NFC interface 137 and encrypts the authentication information with the encryption key B stored in the MFP 100. In the modification, however, the encryption key B is used to encrypt the setting information. This configuration eliminates the need to create the encryption key A unlike the above-described embodiment, leading to a simple process in the MFP 100. In the case where the setting information as the copy target is encrypted with the encryption key A created based on the authentication information as in the above-described embodiment, the procedure for the encryption is complicated, leading to improvement of confidentiality of the setting information.

In this modification, the apparatus-to-USB transfer process begins with S351 at which the CPU 131 reads the encryption key B. The CPU 131 at S352 uses the encryption key B to encrypt the setting information. These processings are different from the processings (S151, S152) using the encryption key A. Since the encryption key B is read first, the processing at S162 is omitted.

In the modification, as in the above-described embodiment, the MFP 200 as the copy destination receives the authentication information from the IC card 50 via the NFC interface 237 and decrypts the authentication information with the decryption key B' stored in the MFP 200. In this modification, however, the decryption key B' is used for decryption of the setting information. This configuration eliminates the need to create the decryption key A' unlike the above-described embodiment, leading to a simple process in the MFP 200. In the case where the setting information as the copy target is decrypted with the decryption key A' created based on the authentication information as in the above-described embodiment, the procedure for the decryption is complicated, leading to improvement of confidentiality of the setting information.

In the modification, the USB-to-apparatus transfer process begins with S464 at which the CPU 231 uses the decryption key B' to decrypt the setting information. This processing is different from the processings (S263, S264) using the encryption key A.

In the copy method of copying the setting information between the MFP 100 and the MFP 200 in the data copy system 900 as described above, the MFP 100 as the copy source receives the authentication information from the IC card 50 via the NFC interface 137 and stores the received authentication information and the setting information as the copy target into the USB memory 60. The MFP 200 as the copy destination receives the authentication information from the IC card 50 via the NFC interface 237 and performs the user authentication by performing the verification between the received authentication information and the authentication information stored in the USB memory 60. This procedure enables the MFP 200 as the copy destination to perform the user authentication without preliminary settings. Thus, even in processing apparatuses in which settings are not performed in advance as in introduction of new apparatuses, copy can be performed without performing preliminary settings, resulting in reduced trouble for the user.

For example, in the case where the setting information for the single MFP 100 is copied to a plurality of the MFPs 200, preliminary settings for user authentication are required for each of the MFPs 200 as in the conventional technique. Examples of the preliminary settings include user registration and network settings for connection to an authentication server. An administrator takes a small amount of trouble of performing the preliminary settings in the case of an already-existing system and in the case where the number of the processing apparatuses as the copy destinations is small. In the case where a large number of processing apparatuses are newly introduced, however, the administrator takes a lot of trouble. That is, since preliminary settings have not been performed in new processing apparatuses, the administrator needs to perform the preliminary settings for all the processing apparatuses, resulting in a lot of trouble for the administrator. In contrast, in the case where the user authentication is performed by the verification between the authentication information received from the IC card 50 and the authentication information stored in the USB memory 60 as in the above-described embodiment, no preliminary settings are required for new processing apparatuses as copy destinations. Thus, in the case where the setting information is copied to a plurality of new processing apparatuses, it is possible to reduce trouble for the administrator in particular.

In the copy method in the above-described embodiment, the setting information and the authentication information are stored in the USB memory 60, and the IC card 50 storing the authentication information identical to the authentication information stored in the USB memory 60 is required to overwrite the setting information stored in the MFP 200. Thus, even if the USB memory 60 is stolen, copy cannot be performed without the IC card 50. Accordingly, the confidentiality of information as a copy target is improved in the copy method in the above-described embodiment.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, any apparatus may be employed as each of the processing apparatuses serving as the copy source and the copy destination as long as the apparatus is capable of performing wireless communication with the mobile terminal and connectable to the storage medium. Examples of the apparatus include not only the MFP but also copying machines, printers, scanners, facsimile machines, personal computers, and tablet computers. Also, the mobile terminal at least needs to be capable of performing wireless communication with the processing apparatus. Examples of the mobile terminal include not only the IC cards but also IC tags and smartphones. Also, the storage medium at least needs to be connectable to the processing apparatus. Examples of the storage medium include not only the USB memory but also SD memory cards, Compact Flashes (registered trademark), and smartphones.

In the above-described embodiment, the processing apparatus as the copy source and the processing apparatus as the copy destination are of the same model but may be of different models. For example, in the case where particular information can be used in both of printers and tablet computers, the particular information may be copied from the printer to the tablet computer.

In the above-described embodiment, each of the MFPs 100, 200 can serve as both of the processing apparatus as the copy source and the processing apparatus as the copy destination. However, the data copy system 900 may be configured such that the MFP 100 has only the function as the processing apparatus as the copy source, and the MFP 200 has only the function as the processing apparatus as the copy destination.

While the NFC wireless communication is employed in the above-described embodiment, the communication standard is not limited to NFC and may be another communication standard. For example, the communication standard may be any of the communication standard according to IEEE 802.11, standards equivalent to it, and Bluetooth (registered trademark).

In the above-described embodiment, when the setting information and the authentication information are stored into the USB memory 60, the copy ID is assigned to each piece of the information stored in the MFP 100, and the MFP 200 verifies the two copy IDs, and when the copy IDs are identical to each other, the setting information is copied. However, the assignment and verification of the copy IDs may not be performed. In the case where the copy IDs are used, however, it is possible to prevent inappropriate copy of the setting information.

The encryption is performed when the setting information is stored into the USB memory 60 in the above-described embodiment but may not be performed. However, the encryption of the setting information as the copy target improves the confidentiality of the setting information.

In the above-described embodiment, the encryption key created based on the authentication information and the encryption key stored in the MFP 100 in advance are used as the encryption key used for the encryption, but the present disclosure is not limited to this configuration. For example, the encryption key may be stored into the IC card 50 and used.

The encryption is performed when the authentication information is stored into the USB memory 60 in the above-described embodiment but may not be performed. However, the encryption of the authentication information complicates the procedure of the user authentication, thereby improving the confidentiality of the setting information as the copy target.

In the above-described embodiment, the folder is created in the USB memory 60, and the setting information and the authentication information are stored into the folder. However, the folder may not be created. Alternatively, the data copy system 900 may be configured such that a shared folder is created, and information is stored into the shared folder in any copy. However, in the case where the folder is created, and the setting information and the authentication information are stored, selection of both of the setting information and the authentication information is finished by selecting the folder. Accordingly, searching information on the MFP 200 is easy for both of the MFP 200 and the user.

The copy history is stored in each of the MFP 100 and the MFP 200 in the above-described embodiment but may not be stored. However, storing the copy history may facilitate checking the presence or absence of unauthorized copy.

The notifications about the completions of the reading and the writhing of the setting information are provided in the above-described embodiment but may not be provided. However, these notifications help the user to recognize the timing when the USB memory 60 is to be removed.

The processings in the above-described embodiment may be executed by hardware such as a single CPU, a plurality of CPUs, and an ASIC or combination thereof. Also, the processings in the above-described embodiment may be executed in various forms such as a non-transitory storage medium storing instructions for executing the processings and methods for executing the processings.

What is claimed is:

1. A copy method of copying information between a first processing apparatus and a second processing apparatus,
   wherein the first processing apparatus comprises: a first storage configured to store a particular information that is usable in the first processing apparatus; a first non-contact interface configured to receive a signal from a mobile terminal by non-contact wireless communication; a first contactable-interface contactable with an external storage medium; and a processor,
   wherein the second processing apparatus comprises: a second storage configured to store a particular information that is usable in the second processing apparatus; a second non-contact interface configured to receive a signal from the mobile terminal by the non-contact wireless communication; a second contactable-interface contactable with the external storage medium; and a processor,
   wherein the copy method comprises steps performed by the processor of the first processing apparatus, and the steps performed by the processor of the first processing apparatus comprise:
       a first receiving step of causing the first non-contact interface to receive authentication information from the mobile terminal by the non-contact wireless communication;
       a first authentication-information storing step of (i) transmitting the authentication information received in the first receiving step to the external storage medium via the first contactable-interface in a state in which the external storage medium is in contact with the first contactable-interface; and is not in contact with the second contactable-interface, and (ii) storing the authentication information into a third storage of the external storage medium; and
       a first particular-information storing step of (i) transmitting the particular information stored in the first storage to the external storage medium via the first contactable interface in the state in which, the external storage medium is in contact with the first contactable-interface, and is not in contact with the second contactable-interface, and (ii) storing the authentication information into a third storage of the external storage medium;, and
   wherein the copy method further comprises steps performed by the processor of the second processing apparatus, and the steps performed by the processor of the second processing apparatus comprise:
       a second receiving step of causing the second non-contact interface to receive authentication information from the mobile terminal by the non-contact wireless communication;
       a reading step of reading the authentication information stored in the third storage of the external storage medium via the second contactable-interface in a state in which the external storage medium is in contact with the second contactable-interface and is not in contact with the first contactable-interface; and
       a second particular-information storing step of (i) receiving the particular information from the third storage of the external storage medium via the second contactable-interface in the state in which the external storage medium is in contact with the second contactable-interface and is not in contact with the first contactable-interface, and (ii) storing the particular information into the second storage of the second processing apparatus, when the authentication information read in the reading step and the authentication information received in the second receiving step match each other.

2. The copy method according to claim 1,
   wherein the steps performed by the processor of the first processing apparatus further comprise a first encrypting step of encrypting the particular information stored in the first storage,
   wherein in the first particular-information storing step, the particular information encrypted in the first encrypting step is stored into the external storage medium in contact with the first connectable-interface,
   wherein in the reading step performed by the processor of the second processing apparatus, the particular information encrypted and stored into the third storage of the external storage medium in contact with the second contactable-interface are further read,
   wherein the steps performed by the processor of the second processing apparatus further comprise a first decrypting step of decrypting the encrypted particular information read in the reading step, and
   wherein in the second particular-information storing step, the decrypted particular information is stored into the second storage.

3. The copy method according to claim 2,
   wherein the steps performed by the processor of the first processing apparatus further comprise an encryption-key creating step of creating an encryption key from the authentication information received in the first receiving step,
   wherein in the first encrypting step, the particular information stored in the first storage is encrypted using the encryption key created in the encryption-key creating step,
   wherein the steps performed by the processor of the second processing apparatus further comprise a decryption-key creating step of creating a decryption key from the authentication information in the reading step, and
   wherein in the first decrypting step, the encrypted particular information read in the reading step is decrypted using the decryption key created in the decryption-key creating step.

4. The copy method according to claim 1,
   wherein the steps performed by the processor of the first processing apparatus further comprise a second encrypting step in which the authentication information received in the first receiving step is encrypted, wherein in the first authentication-information storing step, the authentication information encrypted in the second encrypting step is stored into the third storage of the external storage medium in contact with the first connectable-interface, wherein the steps performed by the processor of the second processing apparatus further comprise a second decrypting step of decrypting the encrypted authentication information read in the reading step, and wherein in the second particular-information storing step, the particular information stored in the third storage of the external storage medium in contact with the second connectable-interface is stored into the second storage when the authentication information decrypted in the second decrypting step and the authentication information received in the second receiving step match each other.

5. The copy method according to claim 1, wherein the steps performed by the processor of the first processing apparatus further comprise a folder creating step of creating a folder in the third storage of the external storage medium in contact with the first connectable-interface, and the folder is for storing the particular information and the authentication information.

6. The copy method according to claim 1, wherein the steps performed by the processor of the first processing apparatus further comprise a history storing step of storing history information into the first storage specifically the history information and the authentication information received in the first receiving step are associated with each other, and the history information indicates that the particular information has been stored into the third storage of the external storage medium in contact with the first connectable-interface.

7. A first processing apparatus, comprising:
a first storage configured to store a particular information that is usable in the first processing apparatus;
a first non-contact interface configured to receive a signal from a mobile terminal by a non-contact wireless communication;
a first contactable-interface contactable with an external storage medium; and
a processor,
wherein the processor is configured to control the first processing apparatus to:
cause the first non-contact interface to receive authentication information from the mobile terminal by the non-contact wireless communication;
transmit the received authentication information to the external storage medium via the first contactable-interface in a state in which the external storage medium is in contact with the first contactable-interface and not in contact with a second contactable-interface of a second processing apparatus,
store the received authentication information into a third storage of the external storage medium;
transmit the particular information stored in the first storage to the external storage medium via the first contactable-interface in the state in which the external storage medium is in contact with the first contactable-interface and not in contact with the second contactable-interface; and
store particular information stored in the first storage, into the third storage of the external storage.

8. A second processing apparatus, comprising:
a second storage configured to store a particular information that is usable in the second processing apparatus;
a second non-contact interface configured to receive a signal from a mobile terminal by a contact wireless communication;
a second contactable-interface contactable with an external storage medium; and
a processor,
wherein the processor is configured to control the second processing apparatus to:
cause the second non-contact interface to receive the authentication information from the mobile terminal by the non-contact wireless communication;
read the authentication information stored in a third storage of the external storage medium via the second contactable-interface in a state in which the external storage medium is in contact with the second contactable-interface and not in contact with a first contactable-interface of a first processing apparatus;
receive the particular information from the third storage of the external storage medium via the second contactable-interface in the state in which the external storage medium is in contact with the second contactable-interface and not in contact with the first contactable-interface; and
store, into the second storage, the particular information stored in the third storage of the external storage medium, when the read authentication information and the received authentication information match each other.

* * * * *